(12) United States Patent
Bulloch

(10) Patent No.: US 7,972,232 B2
(45) Date of Patent: Jul. 5, 2011

(54) CHAIN DRIVE TENSIONER SYSTEM WITH TRANSLATING PIVOT POINT

(75) Inventor: Clyde A. Bulloch, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

(21) Appl. No.: 12/178,700

(22) Filed: Jul. 24, 2008

(65) Prior Publication Data

US 2010/0022336 A1 Jan. 28, 2010

(51) Int. Cl.
*F16H 7/08* (2006.01)
(52) U.S. Cl. ......... 474/109; 474/111; 474/112; 474/133
(58) Field of Classification Search .................. 474/104, 474/109–112, 117, 133–135, 140
See application file for complete search history.

(56) References Cited

U.S. PATENT DOCUMENTS

| | | | | |
|---|---|---|---|---|
| 4,634,407 A | * | 1/1987 | Holtz | 474/112 |
| 4,743,224 A | * | 5/1988 | Yoshikawa et al. | 474/101 |
| 5,591,094 A | * | 1/1997 | Farmer et al. | 474/117 |
| 7,004,865 B2 | * | 2/2006 | Berndt et al. | 474/135 |

FOREIGN PATENT DOCUMENTS

JP 02118249 A * 5/1990
* cited by examiner

*Primary Examiner* — Sang Kim
(74) *Attorney, Agent, or Firm* — Quinn Law Group, PLLC

(57) ABSTRACT

A chain drive tensioner system with translating pivot point is disclosed. The chain drive tensioner system with translating pivot point includes a chain drive tensioner assembly and a tensioner arm in operable communication with a chain. The chain drive tensioner assembly is in operable communication with the tensioner arm, and the tensioner assembly is moveable between a first tensioner position and a second tensioner position. The tensioner arm includes an internal gear and an external gear rotatably mounted within the internal gear, such that movement of the tensioner assembly from the first tensioner position to the second tensioner position along with concurrent rotation of the external gear within the internal gear is operable to move the tensioner arm laterally from a first position to a second position.

8 Claims, 3 Drawing Sheets

CHAIN DRIVE TENSIONER SYSTEM WITH TRANSLATING PIVOT POINT

TECHNICAL FIELD

This invention relates generally to chain drive tensioners and, more particularly, to a chain drive tensioner with a translating pivot point, in which the pivot point of the tensioner arm includes an internal/external gear set that translates to remove more chain slack for a given amount of tensioner movement.

BACKGROUND OF THE INVENTION

Chain drive systems are used to operate ancillary components associated with automotive engines. For example, chain drive systems are used to drive complex valve trains, balance shafts, oil pumps, high pressure fuel injection pumps and water pumps.

The chain drive tensioner system includes a chain drive tensioner and a tensioner arm that engages a chain along an engagement length to create an initial required tension on the chain.

Over time, as the chain of the chain drive system wears, slack is generated in the chain drive system. As the chain wears, it is the chain drive tensioner system that is operable to remove the slack from the system.

Known chain drive tensioner systems generally include a tensioner arm that is fixedly mounted to the engine. As the chain wears, the chain drive tensioner extends causing the tensioner arm to pivot about the mounting point to remove the slack from the chain drive system. However, on some chain drive systems, as the tensioner arm pivots about the fixed mounting point, the engagement length between the tensioner arm and the chain becomes insufficient to remove the slack from the chain drive system.

SUMMARY OF THE INVENTION

A chain drive tensioner system with a translating pivot point is disclosed. The chain drive tensioner system with a translating pivot point includes a chain drive tensioner assembly and a tensioner arm in operable communication with a chain.

The chain drive tensioner assembly is in operable communication with the tensioner arm, and the tensioner assembly is moveable between a first tensioner position and a second tensioner position. The tensioner arm includes an internal gear and an external gear is rotatably mounted within the internal gear, such that concurrent movement of the tensioner assembly from the first tensioner position to the second tensioner position and rotation of the external gear within the internal gear is operable to move the tensioner arm laterally from a first position to a second position.

The tensioner arm engages the chain along an engagement length that remains substantially constant as the tensioner assembly moves between the first tensioner position and the second tensioner position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
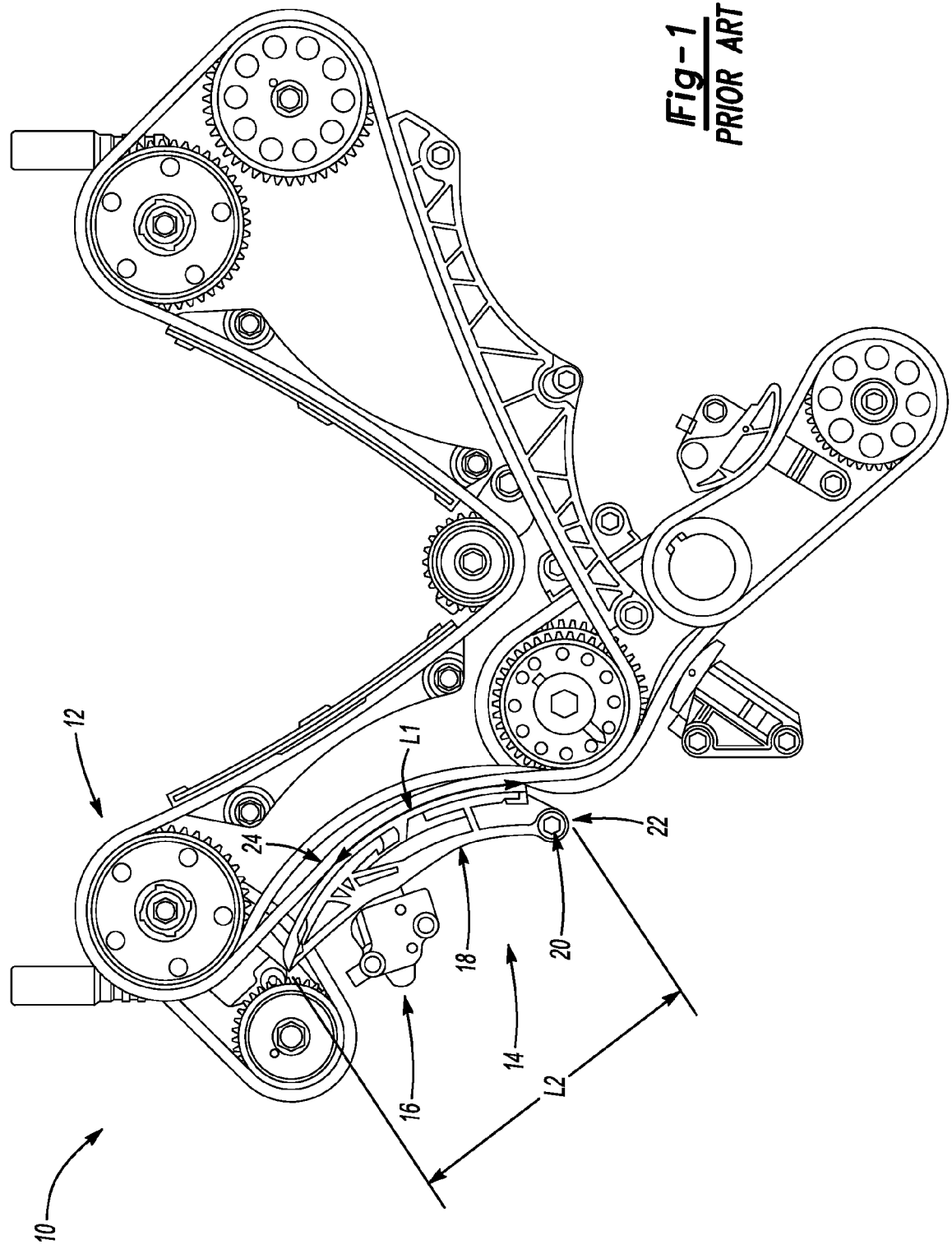
FIG. 1 is a schematic illustration of an internal combustion engine with a chain driven timing drive including a chain drive tensioner system with a fixed pivot point assembly as is known.

Referring to the drawings, wherein like reference numbers refer to like components, FIG. 1 is a schematic illustration of an internal combustion engine, indicated generally at 10, with a chain driven timing drive, indicated generally at 12.

A chain drive tensioner system with a fixed pivot point, indicated generally at 14, includes a chain drive tensioner 16 and a tensioner arm 18 fixedly mounted to the internal combustion engine 10 by a fastener 20 at a fixed pivot point 22. The tensioner arm 18 has an overall length $L_2$.

The chain drive tensioner 16 is in operable communication with the tensioner arm 18, which in turn engages a chain 24 along an engagement length $L_1$ to create a required tension in the chain 24.

As the chain 24 wears, the chain drive tensioner 16 extends toward the tensioner arm 18 causing the tensioner arm 18 to rotate about the fixed pivot point 22.

Initially, when the chain 24 is new, the tensioner arm 18 engages the chain 24 along the engagement length $L_1$. However, as the chain 24 wears and the tensioner arm 18 rotates about the fixed pivot point 22, the engagement length $L_1$ between the tensioner arm 18 and the chain 24 decreases resulting in less surface engagement between the tensioner arm 18 and the chain 24. As such, the engagement length $L_1$ of the tensioner arm 18 can be insufficient to efficiently remove the slack from the chain 24.

Figure 2:
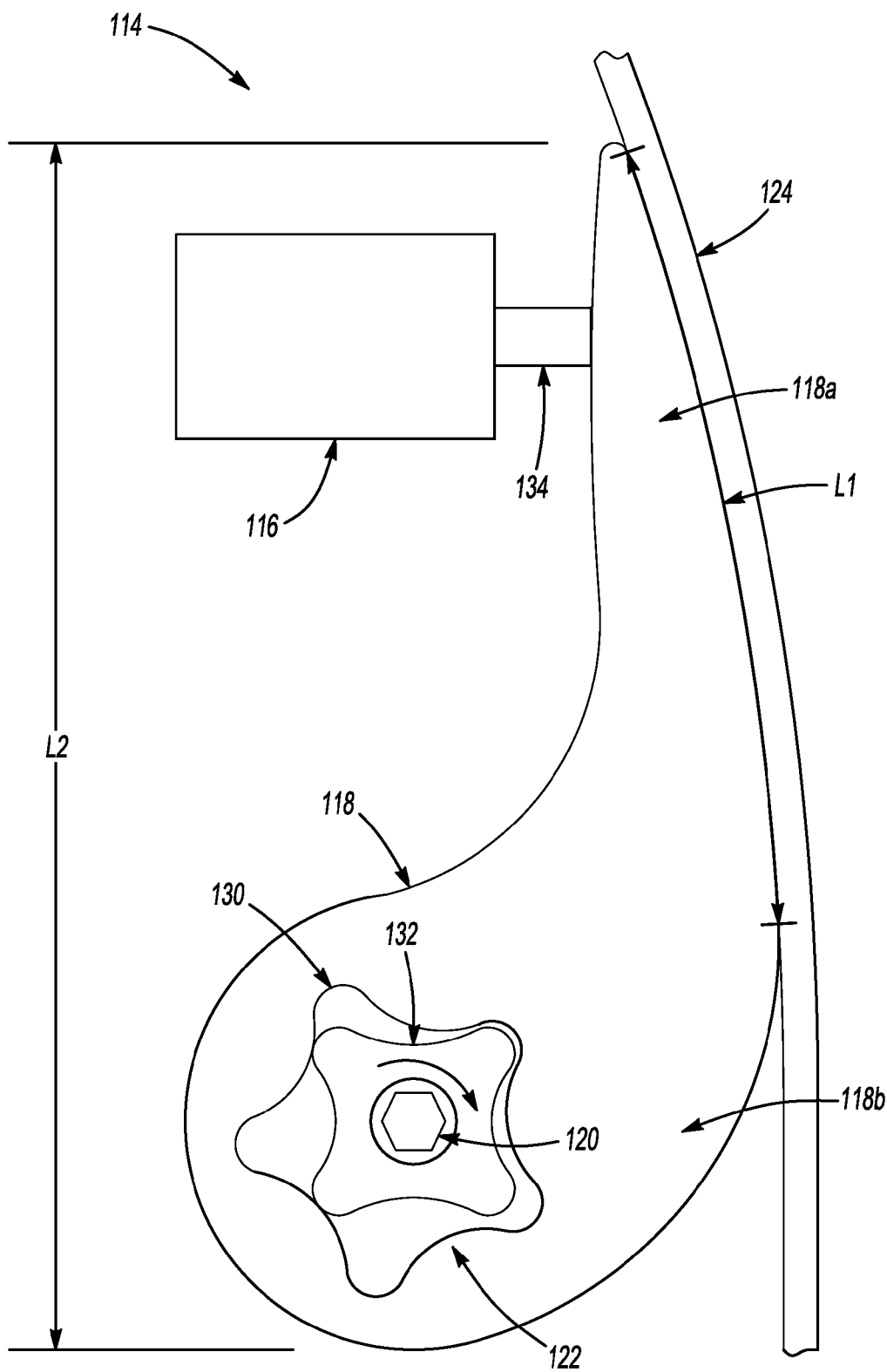
FIG. 2 is a schematic illustration of a chain drive tensioner system with a translating pivot point according to one embodiment of the present invention in a first position.
Figure 3:
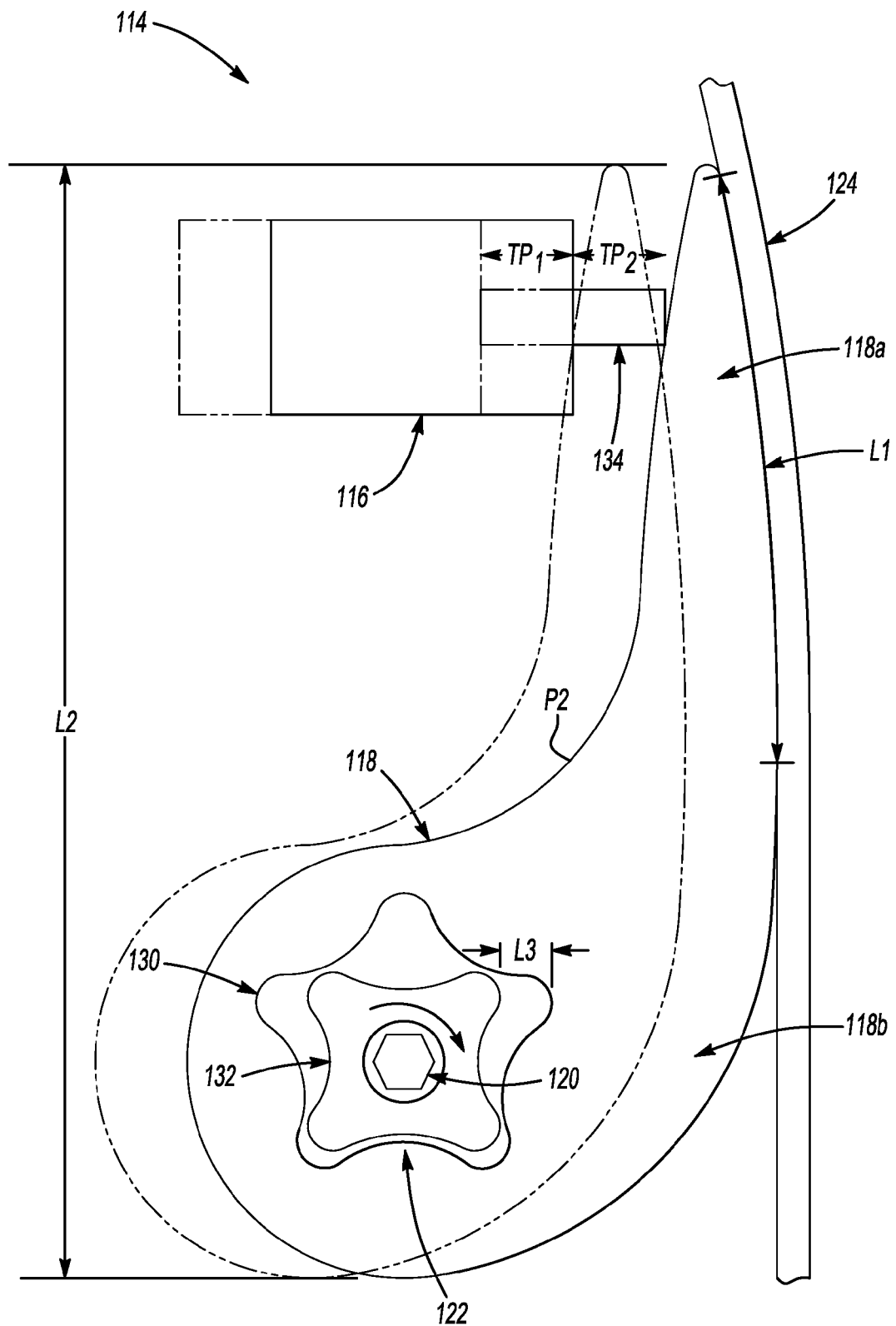
FIG. 3 is a schematic illustration of the chain drive tensioner system with a translating pivot point of FIG. 2 moving from the first position to a second position.

As illustrated in FIGS. 2 and 3, a chain drive tensioner system with a translating pivot point 114 according to one embodiment of the present invention includes a chain drive tensioner 116 and a tensioner arm 118 in engagement with a chain 124. The tensioner arm 118 includes an internal gear socket 130. An external gear 132 is disposed in operable communication within the internal gear socket 130, which is pivotably mounted to the internal combustion engine (not shown) by a fastener 120.

The internal gear socket 130 of the tensioner arm 118 interacts with the external gear 132 to translate rotation of the external gear 132, about a translating pivot point 122, into linear motion of the internal gear socket 130 along a length $L_3$.

It should be appreciated that the internal gear socket 130 and the external gear 132 interact to form an internal-external gear set, which, for example, could be but is not limited to a gerotor gear set.

In the illustrated example embodiment, a chain drive tensioner 116 includes a tensioner piston assembly 134 that extends from a first tensioner position $TP_1$ to a second tensioner position $TP_2$ to engage a tensioner arm 118, which includes the internal gear socket 130.

As the chain 124 wears, the tensioner piston assembly 134 extends outward from the chain drive tensioner 116. As the tensioner piston assembly 134 extends outward from the first tensioner position $TP_1$ to the second tensioner position $TP_2$, a first end 118A of the tensioner arm 118 moves laterally in the direction of the chain 124.

Concurrently, the external gear 132 rotates within the internal gear socket 130 of the tensioner arm 118 about the translating pivot point 122. As the external gear 132 rotates clockwise about the translating pivot point 122, the external gear 132 engages the internal gear socket 130 of the tensioner arm 118 to effectively translate the clockwise rotation of the external gear 132 into linear motion affecting a second end 118B of the tensioner arm 118.

As such, by concurrently moving both the first end 118A and the second end 118B of the tensioner arm 118 laterally from position $P_1$ to position $P_2$, the engagement length $L_1$ between the tensioner arm 118 and the chain 124 remains substantially constant, allowing the tensioner arm 118 to remove more slack from the chain driven system, which, for example, may be the chain driven timing drive system 12 illustrated in FIG. 1, based on the same overall tensioner arm length $L_3$ and the same amount of tensioner piston assembly 134 travel. This results in a more efficient chain drive tensioner system.

It should be appreciated that, while the chain drive tensioner system with a translating pivot point can be applied to a chain driven timing drive, the chain drive tensioner system with a translating pivot point 114 may alternatively be applied to other chain driven systems, which may include but are not limited to, chain drive systems used to drive complex valve trains, balance shafts, oil pumps, high pressure fuel injection pumps and water pumps.

While the best modes for carrying out the invention have been described in detail, those familiar with the art to which this invention relates will recognize various alternative designs and embodiments for practicing the invention within the scope of the appended claims.

The invention claimed is:

1. A chain drive tensioner system comprising:
    a tensioner arm including an internal gear;
    an external gear in operable communication with the internal gear;
    a tensioner assembly in operable communication with the tensioner arm, the tensioner assembly moveable between a first tensioner position and a second tensioner position, wherein movement of the tensioner assembly from the first tensioner position to the second tensioner position along with concurrent rotation of the external gear within the internal gear is configured to move the tensioner arm laterally from a first position to a second position;
    wherein the tensioner arm includes a first end and a second end, the tensioner assembly being in operable communication with the first end of the tensioner arm and the internal gear being disposed in the second end of the tensioner arm; and
    wherein the external gear is rotatable mounted within the internal gear of the tensioner arm and rotation of the external gear translates into linear motion of the second end of the tensioner arm.

2. The chain drive tensioner system as recited in claim 1, further including a chain, wherein the tensioner arm is in operable communication with the chain.

3. The chain drive tensioner system as recited in claim 2, wherein the tensioner arm engages the chain along an engagement length and the engagement length remains substantially constant as the tensioner assembly moves between the first tensioner position and the second tensioner position.

4. A chain drive tensioner system comprising:
    a tensioner arm including a first end and a second end;
    a tensioner assembly in operable communication with the first end of the tensioner arm; and
    a translating pivot point disposed at the second end of the tensioner arm, such that the first end of the tensioner arm and the second end of the tensioner arm move concurrently toward a chain via the tensioner assembly at the first end and the translating pivot point at the second end;
    wherein the translating pivot point includes an internal gear and an external gear disposed within the internal gear; and
    wherein rotation of the external gear translates into linear motion of the second end of the tensioner arm via the internal gear, moving the second end of the tensioner arm from a first position to a second position.

5. The chain drive tensioner system as recited in claim 4, wherein actuation of the tensioner assembly is operable to move the first end of the tensioner arm from the first position to the second position.

6. An internal combustion engine in combination with a chain driven timing drive including a chain drive tensioner system, wherein the chain drive tensioner system comprises:
    a tensioner arm including an internal gear;
    an external gear in operable communication with the internal gear;
    a tensioner assembly in operable communication with the tensioner arm, the tensioner assembly moveable between a first tensioner position and a second tensioner position, wherein movement of the tensioner assembly from the first tensioner position to the second tensioner position along with concurrent rotation of the external gear within the internal gear is configured to move the tensioner arm laterally from a first position to a second position;
    wherein the tensioner arm of the chain drive tensioner system includes a first end and a second end, the tensioner assembly being in operable communication with the first end of the tensioner arm and the internal gear being disposed in the second end of the tensioner arm; and
    wherein the external gear of the chain drive tensioner system is rotatably mounted within the internal gear of the tensioner arm and rotation of the external gear translates into linear motion of the second end of the tensioner arm.

7. The internal combustion engine as recited in claim 6, wherein the chain drive tensioner system further includes a chain and wherein the tensioner arm is in operable communication with the chain.

8. The internal combustion engine as recited in claim 7, wherein the tensioner arm of the chain drive tensioner system engages the chain along an engagement length and the engagement length remains substantially constant as the tensioner assembly moves between the first tensioner position and the second tensioner position.

* * * * *